United States Patent
Beckett et al.

(10) Patent No.: US 11,663,021 B2
(45) Date of Patent: May 30, 2023

(54) SYSTEM AND METHOD FOR PROVIDING GRANULAR PROCESSOR PERFORMANCE CONTROL

(71) Applicant: DELL PRODUCTS, LP, Round Rock, TX (US)

(72) Inventors: John Christopher Beckett, New Braunfels, TX (US); Mukund P. Khatri, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 168 days.

(21) Appl. No.: 17/103,111

(22) Filed: Nov. 24, 2020

(65) Prior Publication Data

US 2022/0164196 A1    May 26, 2022

(51) Int. Cl.
| | |
|---|---|
| G06F 15/177 | (2006.01) |
| G06F 9/00 | (2006.01) |
| G06F 9/445 | (2018.01) |
| G06F 9/38 | (2018.01) |
| G06F 9/50 | (2006.01) |
| G06F 9/4401 | (2018.01) |
| G06F 9/30 | (2018.01) |

(52) U.S. Cl.
CPC ...... *G06F 9/44505* (2013.01); *G06F 9/30079* (2013.01); *G06F 9/3877* (2013.01); *G06F 9/4403* (2013.01); *G06F 9/505* (2013.01)

(58) Field of Classification Search
CPC ............ G06F 9/44505; G06F 9/30079; G06F 9/3877; G06F 9/4403; G06F 9/505; Y02D 10/00
See application file for complete search history.

(56) References Cited

U.S. PATENT DOCUMENTS

| | | | |
|---|---|---|---|
| 8,806,254 B2 | 8/2014 | Berke et al. | |
| 9,619,289 B2 | 4/2017 | Khatri | |
| 9,830,082 B1 * | 11/2017 | Srinivasan | G06F 9/45558 |
| 2014/0282607 A1 * | 9/2014 | O'Sullivan | G06F 11/30 718/108 |
| 2014/0337646 A1 * | 11/2014 | Varma | G06F 1/324 713/322 |
| 2016/0170886 A1 * | 6/2016 | Ma | G06F 12/084 711/122 |
| 2017/0185417 A1 | 6/2017 | Khatri | |
| 2018/0373287 A1 * | 12/2018 | Al-Rawi | G06F 9/5044 |
| 2019/0391846 A1 * | 12/2019 | Kobayashi | G06F 9/5094 |
| 2020/0089883 A1 * | 3/2020 | Morris | G06F 21/52 |
| 2022/0035679 A1 * | 2/2022 | Sunwoo | G06N 5/04 |

* cited by examiner

*Primary Examiner* — Xuxing Chen
(74) *Attorney, Agent, or Firm* — Larson Newman, LLP (57) ABSTRACT

A basic input/output system provides an interface for a core aggregation layout that identifies a grouping of processor cores into core aggregations, wherein each of the core aggregations is associated with a maximum allowable C-state. A processor may monitor an information handling system during operation of an application to gather data associated with latency sensitivity of the application, update the core aggregation layout based on the data gathered during the operation of the application, and pin a thread for execution to one of the processor cores based on the latency sensitivity of the application and the maximum allowable C-state.

17 Claims, 7 Drawing Sheets

SYSTEM AND METHOD FOR PROVIDING GRANULAR PROCESSOR PERFORMANCE CONTROL

FIELD OF THE DISCLOSURE

The present disclosure generally relates to information handling systems, and more particularly relates to providing granular processor performance control.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A basic input/output system provides an interface for a core aggregation layout that identifies a grouping of processor cores into core aggregations, wherein each of the core aggregations is associated with a maximum allowable C-state. A processor may monitor an information handling system during operation of an application to gather data associated with latency sensitivity of the application, update the core aggregation layout based on the data gathered during the operation of the application, and pin a thread for execution to one of the processor cores based on the latency sensitivity of the application and the maximum allowable C-state.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
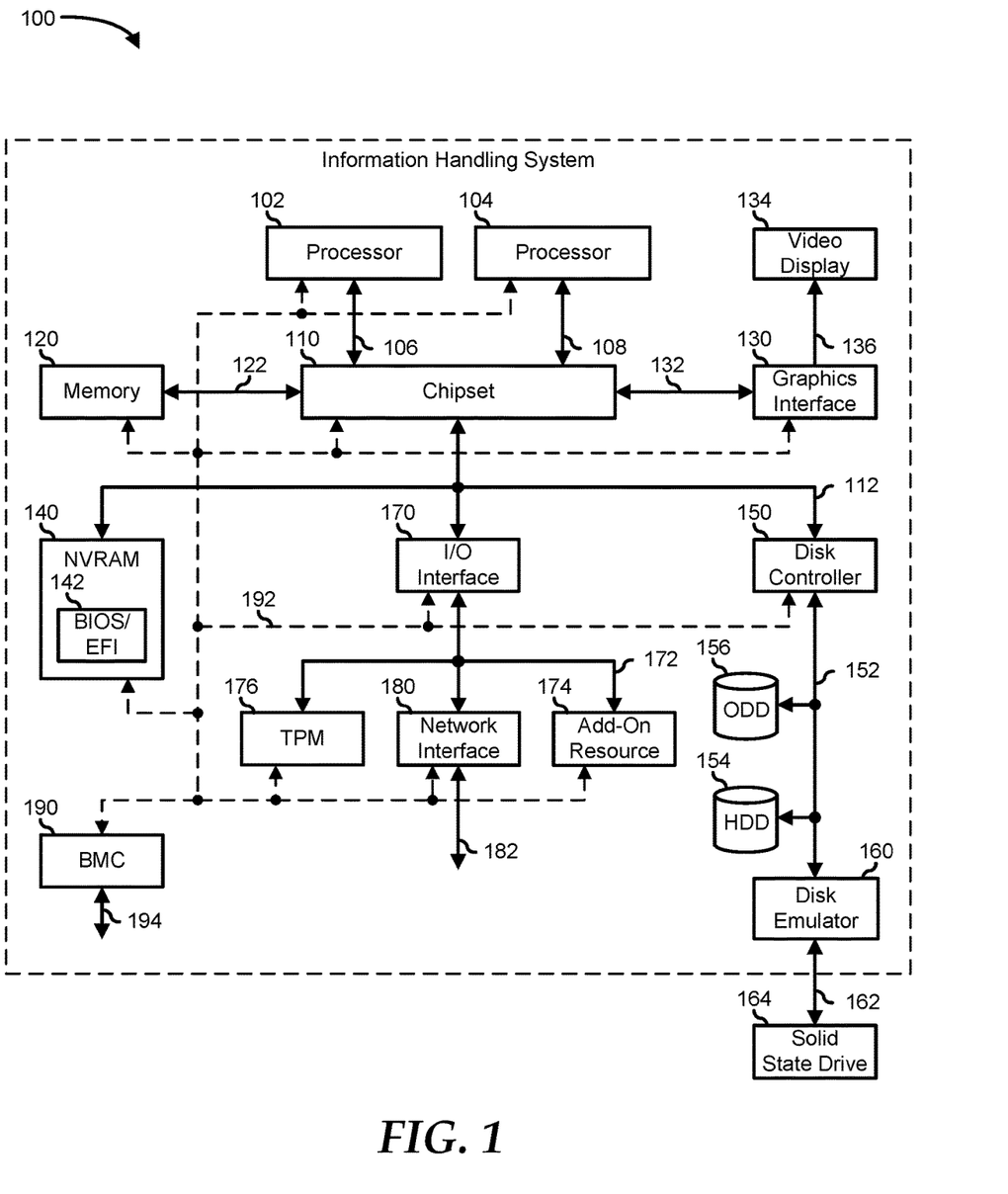
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (x4) PCIe adapter, an eight-lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit (I$^2$C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on a separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Some applications or workloads such as high-frequency trading (HFT) workloads desire jitter-free or low latency operations. To have jitter-free or low latency operations, it is desirable that high turbo mode residency at maximum turbo frequency be maintained on latency and jitter sensitive applications or workloads. Turbo mode allows one or more processor cores to operate at higher than their base operating frequency within power consumption and thermal limitations. As the number of processor cores being used increases, the ability to maintain high turbo mode residency across the processor cores is further challenged by performance versus power management and thermal trade-offs. In addition, high-powered instructions, such as advanced vector extensions (AVX) that expands most integer commands and introduces fused multiply-accumulate (FMA) operations, are being added to the processors. These instructions typically consume more power resulting in increased temperature.

The Advanced Configuration and Power Interface (ACPI) standard is typically followed by operating systems for power management. ACPI allows a processor to be in different power consumption states, generally referred to as C-states or C-modes. The C-states start at C0, which is a normal processor operating mode. At the non-zero C-states, the processor is in a low-power state. The higher the C-number is, the deeper into sleep mode the processor goes.

The deeper the C-state, the higher the resume latency, and the higher the jitter. Jitter may be thought of as the difference between when an event was supposed to occur and when the event occurred. The applications or workloads that are latency and jitter sensitive cannot tolerate the latency and/or jitter impacts of C-state transitions.

To accommodate the latency and jitter sensitivity of some of the applications and workloads, users may disable C-states system-wide. Thus in information handling systems with a multi-core processor, the C-state of the processor cores are disabled even if generally not all of the processor cores are running latency and jitter sensitive applications or workloads. In addition, there is usually a subset of processor cores that runs applications or workloads that are not latency and jitter sensitive, wherein non-zero C-states can be enabled reducing the estimated power consumption and temperature of the information handling system. In addition, disabling the C-states is typically accompanied by increased total power consumption and temperature of the information handling system. Systems and methods described herein are provided to address the aforementioned and other concerns of latency and jitter sensitive applications or workloads by allowing C-state tuning on a more granular level.

Figure 2:
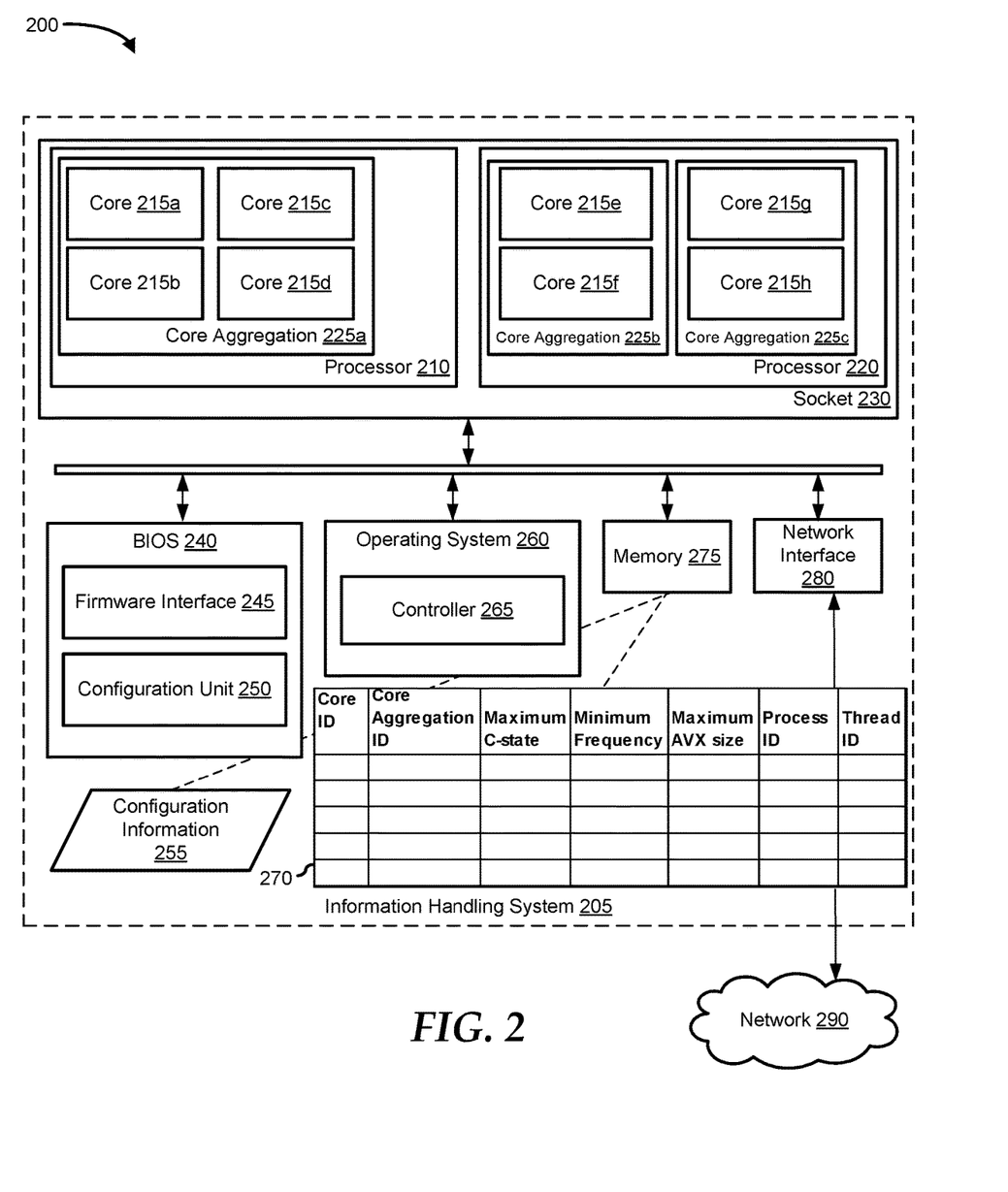
FIG. 2 is a block diagram illustrating an example of a system for providing granular processor performance control of information handling systems, according to an embodiment of the present disclosure.

FIG. 2 shows an example of an environment 200 where systems and methods for providing granular C-states control may be implemented. In particular, environment 200 depicts a static method of granular C-state control as determined by a user such as an administrator. Environment 200 includes a network 290 and an information handling system 205, which is similar to information handling system 100 of FIG. 1. Information handling system 205 includes a socket 230 which is coupled to a processor 210 and a processor 220. Processor 210 and processor 220 are similar to processor 102 and processor 104 of FIG. 1. Processor 210 includes one or more processor cores referred to herein simply as cores such as a core 215a, a core 215b, a core 215c, and a core 215d. Processor 220 includes one or more cores such as a core 215e, a core 215f, a core 215g, and core a 215h. Information handling system 205 also includes a BIOS 240, an operating system 260, a memory 275, and a network interface 280. BIOS 240, which is similar to BIOS/EFI 142 of FIG. 1 includes a firmware interface 245 and a configuration unit 250 while operating system 260 includes a controller 265. Although information handling system 205 is shown with one socket and two processors, wherein each processor has four cores, the scope of the present disclosure is not limited in this regard as in other embodiments there may be less or more sockets and processors and each processor may have less or more cores.

Firmware interface 245 includes a BIOS setup with an option to allow a user such as an administrator to group one or more cores creating different pools of cores or core sets also referred to as "core aggregations." Firmware interface 245 that is compatible with Unified Extensible Firmware Interface (UEFI) specification may be configured as a graphical user interface or a command-line interface. The user may identify the deepest or maximum allowable C-state on a per-core or a per-core aggregation basis. The core aggregation, such as core aggregation 225a, that is mapped to the most latency and jitter sensitive applications or workloads, referred to herein as critical applications or workloads may have the C-states disabled or a maximum allowable C-state of C0. The core aggregation, such as core aggregation 225b, that is mapped to the moderately or the next most latency and jitter sensitive applications or workloads referred to herein as essential applications or workloads, may have a maximum allowable C-state of C1. The core aggregation, such as core aggregation 225c, that is mapped to non-latency sensitive applications or workloads may have a maximum allowable C-state of C3 or greater. Although, shown herein is an example layout of the core aggregations, different layouts of the core aggregations are possible. For example, core aggregation 225a, core aggregation 225b, and core aggregation 225c may have fewer or more cores. In addition, cores from different processors or sockets may belong to one core aggregation.

Configuration unit 250 may include an ACPI method that is configured to transmit configuration information 255 which includes information associated with the processor, cores, or core aggregations to controller 265. Configuration information 255, which may be stored at memory 275, may include operating states of cores 215a through core 215h. Examples of operating states for each one of the cores may include identification of whether the particular core is equal or higher than a desired minimum frequency, identification of whether the particular core meets or exceeds maximum instruction set size, maximum allowable C-states, etc. Configuration unit 250 may transmit configuration information 255 at the initial startup of information handling system 205. In addition, configuration unit 250 may transmit core mapping table 270 or its storage location at memory 275 to controller 265. Memory 275 may be an NV-RAM that is accessible by processor 210, processor 220, BIOS 240, memory 275, and network interface 280. Memory 275 may be an NV-RAM.

Core mapping table 270, maybe an ACPI table that shows the mapping of each core to a core aggregation. In addition, core mapping table 270 may include additional information such as the minimum frequency, maximum instruction size, and maximum C-state allowable for each core or core aggregation. A core aggregation may be a set of cores that is grouped based on the maximum allowed C-state. The core aggregation may also be a set of cores that are grouped based on the minimum frequency the core is set to operate or the maximum size of instruction sets such as AVX and FMA for processing. For example, each of the core aggregations may have a minimum frequency target and/or maximum instruction depth. Core mapping table 270 may include information regarding the application, workload, process, or thread mapped to each core or core aggregation. Globally unique identifiers may be used in the mapping such as a core identifier, a core aggregation identifier, a process identifier, a thread identifier, an application identifier, a workload identifier, etc. In one embodiment, the size of core mapping table 270 may be equal to the number of cores or core aggregations.

Controller 285 may be configured to map or pin the cores to the core aggregation and each of the cores or the core aggregations to an application, a workload, a process, a thread, or a combination thereof such that the application, the workload, the process, the thread will execute on the designated core or core aggregation rather than on the other core aggregations. In addition, controller 285 may be configured to enforce the limitations associated with the core aggregations such as the maximum C-state allowable for each of the cores in a core aggregation, the minimum frequency, the maximum size of the instruction set, or a combination thereof. Also controller 265 may be configured to determine the frequency that the cores can operate in and the size of its instruction sets, based on configuration information 255. For example, controller 265 can determine the minimum operating frequency, standard frequency, base frequency, maximum frequency, or turbo mode frequency of each core. Controller 285 may be configured to allow the mapping of threads to cores or core aggregations to be user-configurable such that the user of the information handling system can configure or customize the mapping of the workload threads to specific cores or specific core aggregations.

The applications may be local applications or remote applications in network 290 that are accessible via network interface 280. This mapping or pinning allows the critical application, workload, process, or thread to run on core aggregations with a disabled C-state or a maximum C-state of C0. The non-critical application, workload, process, or threads can be pinned or mapped in core aggregations with deeper maximum allowable C-states reducing power consumption and temperature of the information handling system. Controller 285 may be configured to route process and/or threads to its associated core based on core mapping table 270 and configuration information 255. Accordingly, controller 265 may also access core mapping table 270 to determine the maximum allowed C-state of the core before putting the processor core in a particular C-state.

Network interface 280, which is similar to network interface 180 of FIG. 1, enables information handling system 205 to communicate and/or interface with other devices, services, and components that are located external to information handling system 205. These devices, services, and components can interface with information handling system 205 via an external network such as network 290. Network 290 can be a local area network, a wide area network, a personal area network, and the like. The connection between network 290 and information handling system 205 can be wired, wireless, or a combination thereof. For purposes of discussion, network 290 is indicated as a single collective component for simplicity. However, it is appreciated that network 290 can include one or more direct connections to other devices as well as a more complex set of interconnections as can exist within a wide area network, such as the Internet.

Figure 3:
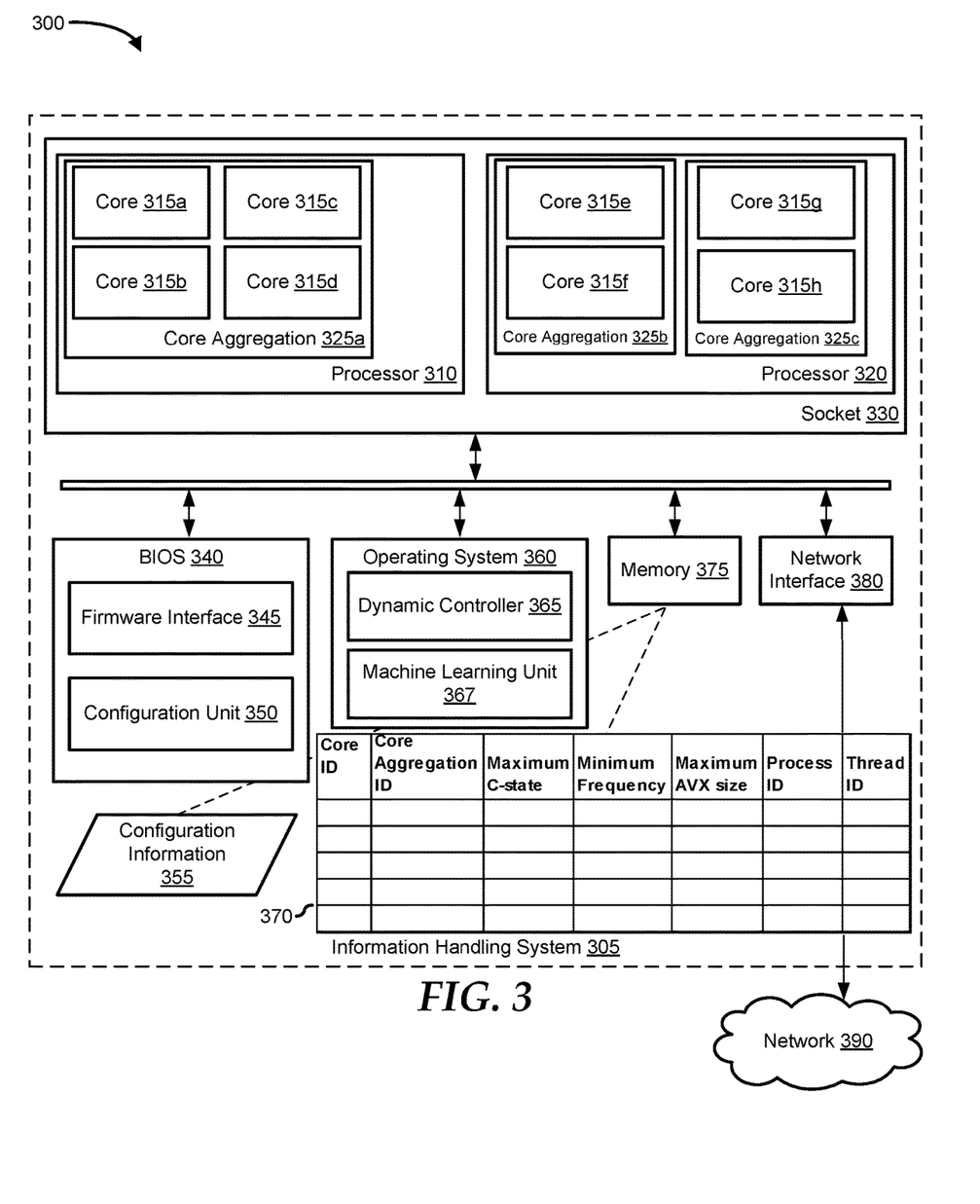
FIG. 3 is a block diagram illustrating an example of a system for providing granular processor performance control of information handling systems, according to an embodiment of the present disclosure.

FIG. 3 shows an example of an environment 300 where systems and methods for providing granular C-states control may be implemented. In particular, environment 300 depicts a dynamic method of granular C-state control as determined by a user such as an administrator. Environment 300 includes a network 390 and an information handling system 305, which is similar to information handling system 200 of FIG. 2. Information handling system 305 includes a socket 330 which is coupled to a processor 310 and a processor 320. Processor 310 and processor 320 are similar to processor 210 and processor 220 of FIG. 2. Processor 310 includes one or more cores, such as a core 315a, a core 315b, a core 315c, and a core 315d. Processor 320 includes one or more cores such as a core 315e, a core 315f, a core 315g, and a core 315h. Information handling system 305 also includes a BIOS 340, an operating system 360, a memory 375, and a network interface 380. BIOS 340, which is similar to BIOS 240 of FIG. 2 includes a firmware interface 345 and a configuration unit 350 while operating system 360 includes a dynamic controller 365 and a machine learning unit 367. Although information handling system 305 is shown with one socket and two processors, wherein each processor has four cores, the scope of the present disclosure is not limited in this regard as in other embodiments there may be less or more sockets and processors and each processor may have less or more cores.

Firmware interface 345, which is similar to firmware interface 245 of FIG. 2, may include a BIOS setup with an option to allow a user to group one or more cores creating different core aggregations. In addition, firmware interface 345 may include an option that allows the user to accept, reject, or modify the core aggregations and its configuration and/or mappings as recommended by dynamic controller 365 and/or machine learning unit 367.

Machine learning unit 367 may be configured to monitor information handling system 305 during the execution of one or more applications, workloads, processes, and/or threads to gather data associated with the performance of processor 310 and processor 320. This may be referred to as a learning phase, wherein machine learning unit 367 learns about the characteristics and/or latency and jitter sensitivity of the applications and/or workloads. The data gathered may be associated with where and how the applications and/or workloads exercise the cores, memory, storage device(s), etc. Machine learning unit 367 may gather data associated with the priority, jitter, size of instruction sets, etc. to determine which of the applications, workloads, processes, threads, etc. are critical, essential, or otherwise. For example, machine learning unit 367 may determine the latency based on the priority of the processes and/or the threads. In another example, machine learning unit 367 may determine the jitter based on the difference between a predicted execution time and a measured execution time of a thread or process. Jitter can occur if the measured times are longer or shorter than the predicted execution times. The applications may also have new application programming interfaces (APIs) that can be used by the applications to publish or report their latency sensitivity, frequency, and desired size of the instruction set to machine learning unit 367. Machine learning unit 367 may also use the APIs to query the latency sensitivity, frequency and desired instruction set size of the applications. The data gathered may be included in configuration information 355 which is stored at memory 375.

Machine learning unit 367 may also be configured to train a machine learning model using the data gathered during the learning phase of the applications, workloads, processes, and/or threads against a trained machine learning model to generate or update a core aggregation layout or configuration of the cores and/or the core aggregations. Machine learning unit 367 may also factor the different performance/latency characteristics of each core, which may be in generating or updating the core pole layout or configuration. The core aggregation layout may include information similar to information in the core mapping table 370, such as which core belongs to which core aggregation. In particular, the core aggregation layout may include the number and configuration of the core aggregations and the cores mapped to each core aggregation as depicted in core mapping table 370 stored in memory 375. The configuration may include the maximum allowable C-state, minimum frequency, and maximum size of the instruction sets for each core in the core aggregation.

A register may store information regarding the applications and/or the workloads such as maximum latency tolerance values and the lowest latency values. Dynamic controller 365 may monitor the performance of the cores and/or the core aggregations and determine whether the applications or workloads are executing within the latency tolerance values. If an application or workload is not executing within the latency tolerance values, then dynamic controller 365 may determine whether to update or change the configuration of the core aggregations. For example, dynamic controller 365 may add or remove a core from one core aggregation. Dynamic controller 365 may also move a core from one core aggregation to another core aggregation. For example, if a critical application fails to meet its desired latency, then dynamic controller 365 may move a core from a first core aggregation that executes essential applications or workloads to a second core aggregation that executes critical applications or workloads. Dynamic controller 365 may also change the attributes of the core aggregations such as its maximum allowable C-state, minimum frequency, or maximum size of the instruction set.

Core mapping table 370, which is similar to core mapping table 270 of FIG. 2, maybe an ACPI table that shows the mapping of each core to a core aggregation. In addition, core mapping table 370 may include additional information such as the minimum frequency, maximum AVX size, and maximum C-state allowable for each core or core aggregation. Dynamic controller 365 may query core mapping table 370 and dynamically pin processes or threads to cores based on the latency sensitivity of the processes or threads, the maximum allowable states of the cores, configuration information 355, etc. Configuration information 355 may include data associated with latency and/or performance characteristics of the processor, cores and/or core aggregations such as target residency which is the minimum duration a processor or core has to stay in a C-state to overcome the enter/exit power costs and exit latency which is the maximum time it will take a processor or core to start executing an instruction after a wakeup from a C-state.

Here, the core aggregation, such as core aggregation 325a, that is mapped to the most latency and jitter sensitive applications or workloads, referred to herein as critical applications or workloads may have a maximum allowable C-state of C0. The core aggregation, such as core aggregation 325b, that is mapped to the next most latency and jitter sensitive applications or workloads referred to herein as essential applications or workloads, may have a maximum allowable C-state of C1. The core aggregation, such as core aggregation 325c, that is mapped to non-latency sensitive application or workloads may have a maximum allowable C-state of C3 or greater. Although, shown herein is an example layout of the core aggregations, different layouts of the core aggregations are possible. For example, core aggregation 325a, core aggregation 325b, and core aggregation 325c may have fewer or more cores. Dynamic controller 365 may also be configured to provide the location of one or more registers that includes the layout of the core aggregations to a runtime scheduler which may determine to utilize the layout of the core aggregations when scheduling the processes and/or threads.

Dynamic controller 365 may be similar to controller 265 of FIG. 2, wherein dynamic controller 365 can control the operation of the cores 315a to 315n based on core mapping table 370 and configuration information 355 received from configuration unit 350, which is similar to configuration unit 250 of FIG. 2. However, dynamic controller 365 may have additional functions as discussed below. For example, before enforcing the core aggregation layout as depicted in core mapping table 370, dynamic controller 365 may allow the user to accept, reject, or modify the core aggregations and its configuration. Dynamic controller 365 may allow a user to update the maximum allowable C-states of the core aggregations at runtime. Dynamic controller 365 may also determine whether it is "after hours" including holidays and weekends and dynamically update the maximum allowable C-states of one or more core aggregations to allow for deeper C-state residency to save power and/or improve temperature. Dynamic controller 365 may also monitor the cores and/or the core aggregations while enforcing the core aggregation layout. Based on the monitoring, dynamic controller 365 may request at runtime dynamic latency tuning of the cores or core aggregations, such as decrease the maximum allowable C-state, increase the minimum frequency, or increase the maximum size of the instruction set.

Dynamic controller 365 may monitor the performance of critical applications, workloads, processes, or threads and update the configuration of the core aggregations accordingly. For example, the configuration may be updated a runtime based on the performance such as failing to meet a threshold such as failure to meet the latency or jitter characteristics. Dynamic controller 365 may also update the configuration of the core aggregations and core mapping table 370 based on other factors such as when characteristics of the applications, workloads, processes, or threads change. For example, after work hours during weekdays and/or weekends when demand for the critical applications, workloads, processes, or threads is low, then the dynamic controller 365 may update the configuration of the core aggregations. In another example, dynamic controller 365 may not utilize the core aggregations mapped to the critical applications, workloads, processes, or threads after hours and utilize the other core aggregations instead. Dynamic controller 365 may also generate a report based on the performance of the applications and/or workloads. The report may be transmitted to machine learning unit 367 which may then factor the report in generating the core aggregation layout or configuration.

Figure 4:
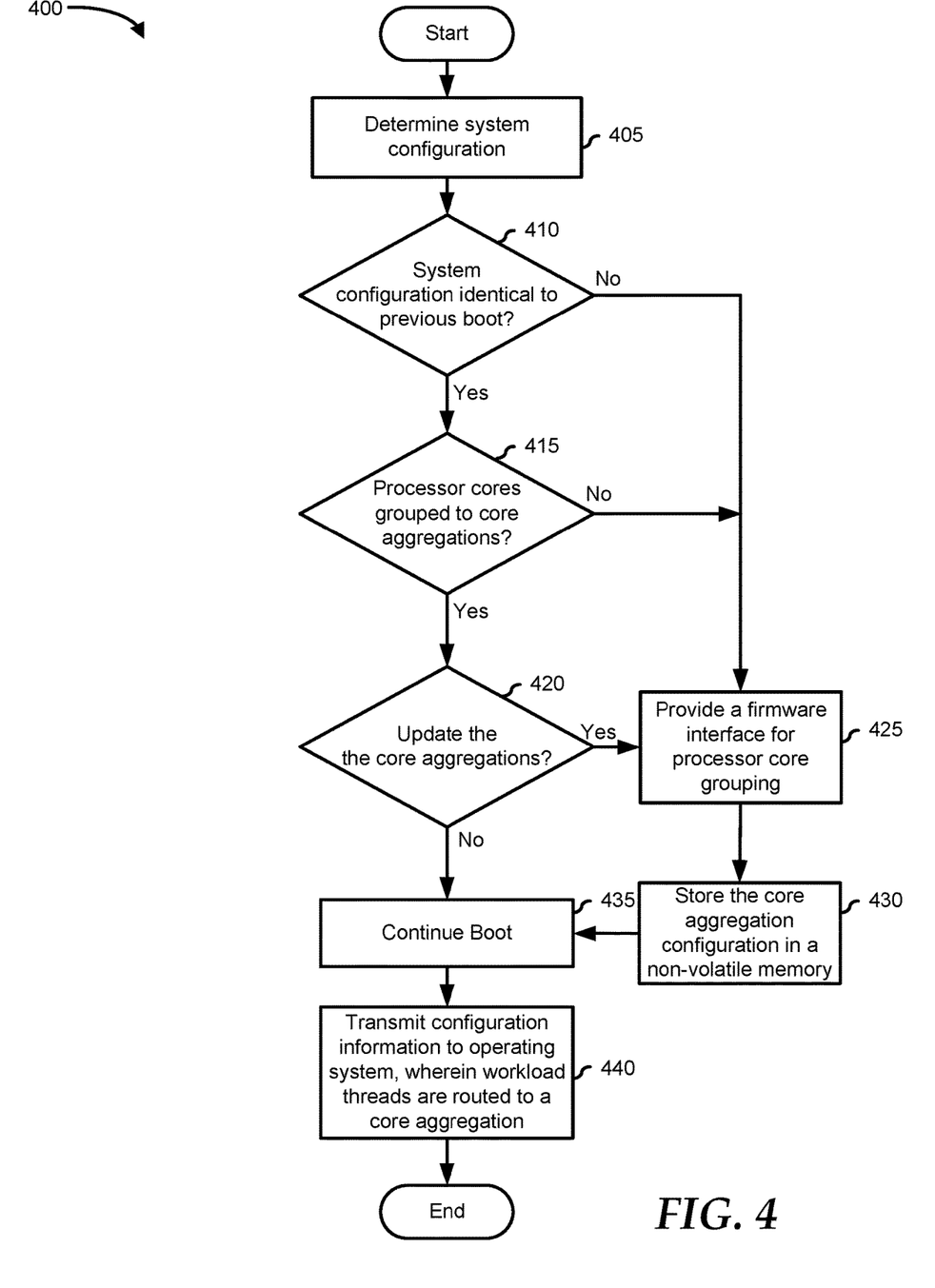
FIG. 4 is a flowchart illustrating an example of a method for providing granular processor performance control of information handling systems, according to an embodiment of the present disclosure.

FIG. 4 illustrates a method 400 for granular processor performance control. While embodiments of the present disclosure are described in terms of environment 200 of FIG. 2, it should be recognized that other systems may be utilized to perform the described method. Method 400 typically starts at block 405 where the method determines system configuration of an information handling system. In particular, the BIOS may determine the system configuration during the initialization or boot process of the information handling system.

Method 400 proceeds to decision block 410 where the method, the BIOS, in particular, determines whether the current system configuration of the information handling system is identical to a previous system configuration at the previous boot. If the current system configuration is identical to the previous system configuration, then the "YES" branch is taken and the method proceeds to decision block 415. If the current system configuration is not identical to the previous system configuration, then the "NO" branch is taken and the method proceeds to block 425.

At decision block 415, the method determines whether the processor cores are grouped into one or more core aggregations, such as by identifying whether a core mapping table is stored in a memory. The processor cores may be grouped into at least two core aggregations, a first core aggregation for critical applications, workloads, processes, and/or threads and a second core aggregation for the essential and non-essential applications, workloads, processes, and/or threads. If the method determines that the processor cores are grouped into core aggregations, then the "YES" branch and taken and the method proceeds to decision block 420. If the method determines that the processor cores are not grouped into core aggregations, then the "NO" branch and taken and the method proceeds to block 425.

At decision block 420, the method determines whether to update the core aggregations. For example, the method may receive a hotkey from the user to enter a BIOS setup and update the core aggregations. In another example, the core aggregation layout may be unavailable or invalid. If the method determines to update the core aggregations, then the "YES" branch is taken and the method proceeds to block

425. If the method determines to not update the core aggregations, then the "NO" branch is taken and the method proceeds to block 435 where the method continues with the initialization or boot process.

At block 425, the method provides a firmware interface for a user to group the processor cores into core aggregations or update the core aggregation layout. The firmware interface may be a graphical user interface or a command-line interface. The user may run a script via the command line that groups the processor cores into core aggregations. The method proceeds to block 430, where the method may store the core aggregation layout in an NV-RAM. The core aggregation layout may be stored as a core mapping table. At block 440, the method transmits configuration information associated with the cores and/or core aggregations such as the number and identifiers of cores in each core aggregation, base frequency, size of instruction sets, etc. to the operating system. Also, the method may transmit the location of the core mapping table. The method then ends.

Figure 5:
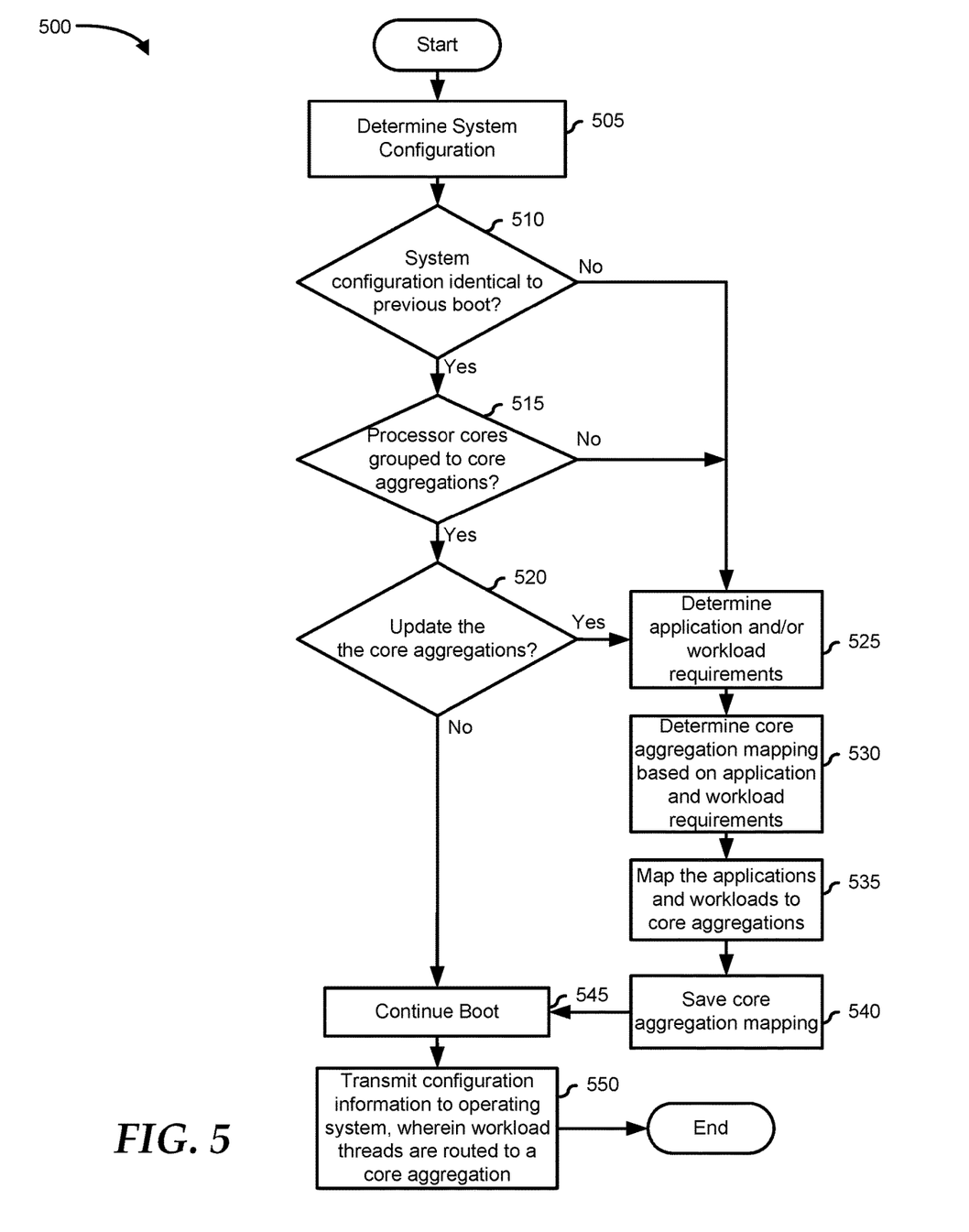
FIG. 5 is a flowchart illustrating an example of a method for providing granular processor performance control of information handling systems, according to an embodiment of the present disclosure.

FIG. 5 illustrates a method 500 for granular processor performance control. While embodiments of the present disclosure are described in terms of environment 300 of FIG. 3, it should be recognized that other systems may be utilized to perform the described method. Method 500 typically starts at block 505 where the method determines system configuration of an information handling system. In particular, the BIOS may determine the system configuration during the initialization or boot process of the information handling system.

Method 500 proceeds to decision block 510 where the method, the BIOS, in particular, determines whether the current system configuration of the information handling system is identical to a previous system configuration at the previous boot. If the current system configuration is identical to the previous system configuration, then the "YES" branch is taken and the method proceeds to decision block 515. If the current system configuration is not identical to the previous system configuration, then the "NO" branch is taken and the method proceeds to block 525.

At decision block 515, the method determines whether the processor cores are grouped into one or more core aggregations, such as by identifying whether a core mapping table is stored in a memory. The processor cores may be grouped into at least two core aggregations, a first core aggregation for critical applications, workloads, processes, and/or threads and a second core aggregation for the essential and non-essential applications, workloads, processes, and/or threads. If the method determines that the processor cores are grouped into core aggregations, then the "YES" branch and taken and the method proceeds to decision block 520. If the method determines that the processor cores are not grouped into core aggregations, then the "NO" branch and taken and the method proceeds to block 525.

At decision block 520, the method determines whether to update the core aggregations. For example, the method may receive a hotkey from the user to enter a BIOS setup and update the core aggregations. In another example, the method may determine whether to update the core aggregation based on a report associated with the prior performance of the core aggregations. If the method determines to update the core aggregations, then the "YES" branch is taken and the method proceeds to block 525. If the method determines to not update the core aggregations, then the "NO" branch is taken and the method proceeds to block 545 where the method continues with the initialization or boot process.

At block 525, the method may determine the application and/or workload characteristics based on the configuration information gathered during boot. The configuration information may also be based on data gathered during the learning phase, wherein ongoing applications and/or workloads to determine their performance desired characteristics such as latency, minimum frequency, and maximum size of instruction sets. The method may proceed block At block 530, the method may determine the core aggregation mapping also referred to as core pole layout based on the application and/or workload characteristics which also include determining which of the cores are mapped to which core aggregations. The method may also determine the properties of the core aggregations such as its maximum allowable C-states, minimum frequency, and maximum size of instruction sets and use them as another set of factors in determining the core aggregation layout.

At block 535, the method may map the applications and/or workloads to the core aggregations. The method may determine which applications and/or workload are critical, essential, or otherwise. Critical applications and/or workloads may be mapped to a core aggregation wherein its maximum allowable C-state is C0. Also, essential applications and/or workloads may be mapped to another core aggregation wherein its maximum allowable C-state is C3 and the rest of the applications and/or workloads are mapped to a third core aggregation wherein its maximum allowable C-state is C6.

At block 540, the method saves the updated or new core aggregation layout to an NV-RAM which is accessible by the BIOS and the operating system. The method proceeds to block 545 where the method proceeds with the initialization or boot process. The method proceeds to block 550, where the method transmits configuration information associated with the processors such as the number of cores, base frequency, size of instruction sets, etc. to the operating system. Also, the method may also transmit the location of the core mapping table which includes information regarding the core aggregation layout. The method then ends.

Figure 6:
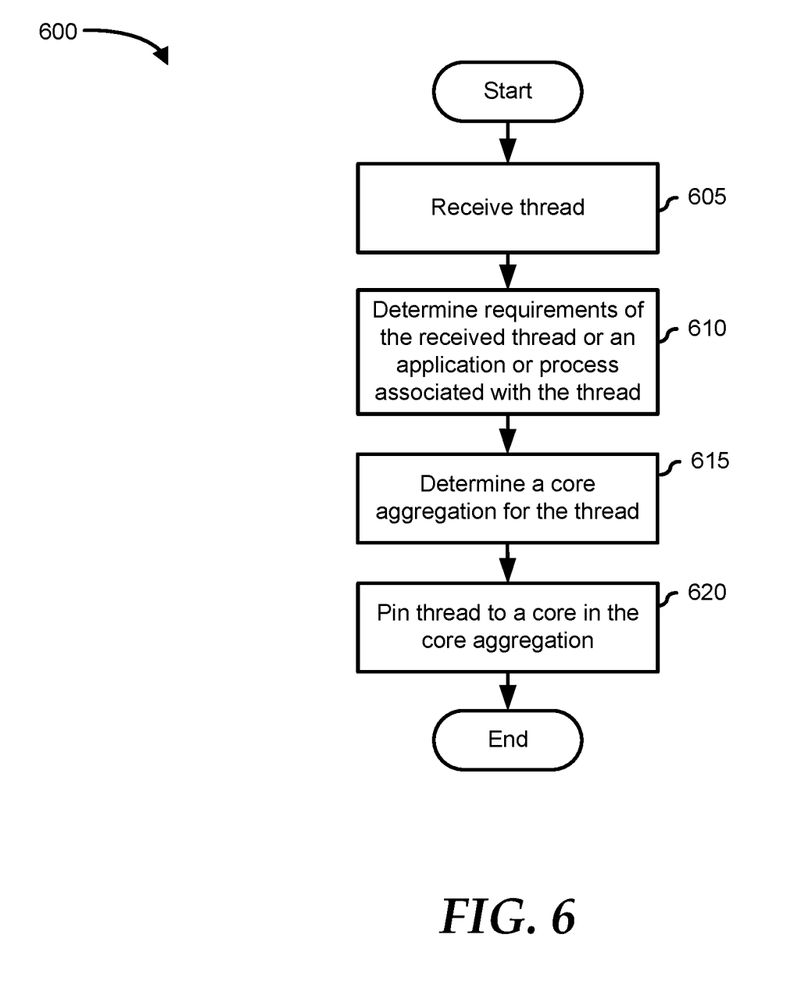
FIG. 6 is a flowchart illustrating an example of a method for providing granular processor performance control of information handling systems, according to an embodiment of the present disclosure.

FIG. 6 illustrates a method 600 for executing applications based on granular processor performance control. While embodiments of the present disclosure are described in terms of environment 200 of FIG. 2 or environment 300 of FIG. 3, it should be recognized that other systems may be utilized to perform the described method. Method 600 typically starts at block 605 where an application starts and the method receives a thread for execution. The method proceeds to block 610.

At block 610, the method determines the characteristics of the received thread or the application and/or process associated with the thread. For example, the method determines the desired latency of the thread which may be based on its priority and/or the priority of the application, workload, or process associated with the thread. The method may also determine the characteristics such as the frequency and/or instruction set size of the thread or the application, workload, or process associated with the thread. Based on the characteristics, the method may determine whether the thread, application, workload, or process is critical, essential, or otherwise. In another embodiment, the thread may include a property that identifies whether the thread is critical, essential, or otherwise. The application, workload, or process may also include a property that identifies whether the application is critical, essential, or otherwise.

The method proceeds to block 615, where the method determines the core aggregation where the thread is to be executed based on the above characteristics. After determining the core aggregation, the method pins or maps the thread to a core in the core aggregation. In another embodiment, the method proceeds to block 620 where the method may pin the application, workload, or process to the core in the core aggregation, wherein threads received subsequent to the current thread will automatically be routed to the core. After the pinning or the mapping of the application, workload, process, or thread, the method ends.

Figure 7:
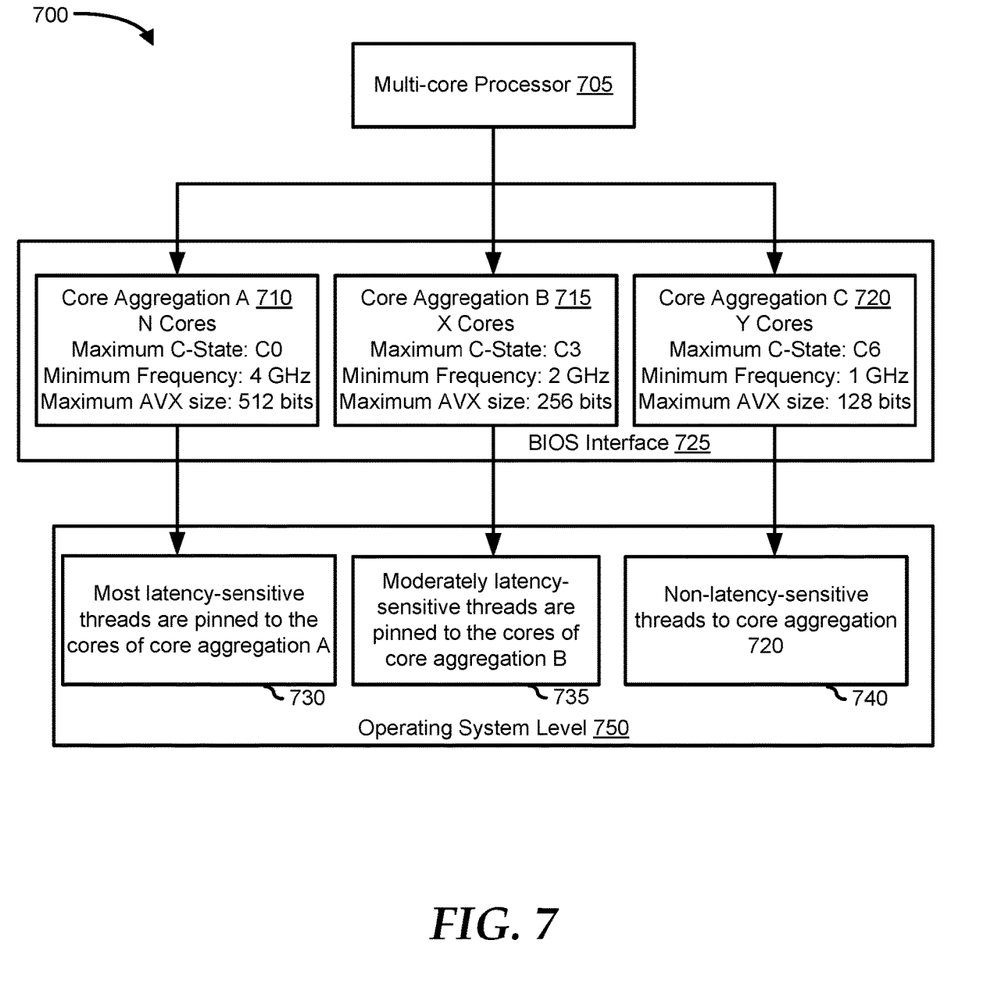
FIG. 7 is a block diagram illustrating an example of a system for providing granular processor performance control of information handling systems, according to an embodiment of the present disclosure.

FIG. 7 shows a block diagram of a system 700 of a multi-core processor 705 with granular processor performance control. Multi-core processor 705 includes three sets of cores also referred to as core aggregations: a core aggregation A 710, a core aggregation B 715, and a core aggregation C 720. Core aggregation A 710 is a set of N cores, where N is a number of cores, with a maximum allowable C-state of C0 to minimize turbo mode residency jitter, a minimum frequency of 4 GHz, and a maximum AVX size of 512 bits. Core aggregation B 715 is a set of X cores, where X is a number of cores, with a maximum allowable C-state of C3, minimum frequency of 2 GHz, and a maximum AVX size of 256 bits. Core aggregation C 720 is a set of Y cores, where Y is a number of cores, with a maximum allowable C-state of C6, a minimum frequency of 1 GHz, and a maximum AVX size of 128 bits. By allowing the Y cores to go into deeper C-states, there is power and thermal headroom to accommodate core aggregation A 710 and core aggregation B 715 when entering turbo mode residency. Multi-core processor 705 may be grouped into different core aggregations than shown by a user via BIOS interface 725. Multi-core processor 705 may also be grouped different core aggregations dynamically by the BIOS firmware or an operating system driver/controller based on a trained model.

The model may be trained using data collected during a learning phase. During the learning phase, parameters for performance and utilization of one or more applications under execution may be measured, analyzed, and stored. In certain embodiments, the data may include processor core utilization, the number of active processor cores, time spent in various C-states, frequency wherein the processor cores are running, size of instruction sets, etc. In other embodiments, the data may also include activity by the processor core, processor queue length, turbo frequency, C-state residency, size of instruction sets, etc.

At block 730, at operating system level 750, the most latency-sensitive threads are pinned to the N cores at core aggregation A 710. At block 735, the most latency-sensitive threads are pinned to the N cores at core aggregation B 715. At block 740, the threads that are not latency-sensitive are pinned to the Y cores at core aggregation B 715. In some implementations, multi-core processor 705 may be configured to execute applications that require very low latencies or high operating frequencies with reduced execution jitter such as HFT applications or the like. The applications can be divided into one or more portions, each portion having threads that are then scheduled to be executed by one or more processor cores. For example, a first portion of the application may include a feed handling, which receives data from a securities exchange. A second portion of the application may include an analytics platform configured to analyze the incoming data and make trading decisions. A third portion of the application may include a trading platform that sends trading orders to the exchange. In some cases, the first portion of the application may include latent/jitter sensitive threads whereas the second portion of the application may include moderately latent-sensitive threads and the third portion includes non-latent/jitter sensitive threads.

In some cases, threads from the first portion of the application may be assigned to the first core aggregation while threads from the second portion of the application may be assigned to the second core aggregation. Also, core aggregations may be selected based on the type of instructions to be executed. For example, high power instructions such as AVX instructions or FMA instructions may be executed in the first core aggregation while non-high power instructions may be executed in the second core aggregation resulting in low latency and/or jitter-free operation in both the high power instructions and the non-high power instructions without sacrificing performance on the non-high power instructions. Here, threads from the first portion of the application may be assigned to core aggregation A 710. Threads from the second portion of the application may be assigned to core aggregation B 715 and threads from the third portion of the application may be assigned to core aggregation C 720.

Although FIG. 4, FIG. 5, and FIG. 6 show example blocks of method 400, method 500, and method 500 in some implementation, method 400, method 500, and method 600 may include additional blocks, fewer blocks, different blocks, or differently arranged blocks than those depicted in FIG. 4, FIG. 5, and FIG. 6. Additionally, or alternatively, two or more of the blocks of method 400, method 500, and method 600 may be performed in parallel. For example, block 425 and block 430 of method 400 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
in response to determining that a current system configuration is not identical to a previous system configuration at a previous boot, grouping, by a processor, a plurality of processor cores into core aggregations, wherein each one of the core aggregations is associated with a maximum allowable C-state;
generating a map of the core aggregations based on the grouping to be used when routing a thread for execution; and
routing the thread for execution to one of the processor cores based on a latency requirement of the thread and the maximum allowable C-state of a core aggregation of the core aggregations as depicted in the map, wherein the routing the thread for the execution to the core aggregations is further based on a maximum size of an instruction set of the core aggregation.

2. The method of claim 1, wherein the routing the thread for the execution to the core aggregation is further based on a minimum frequency of the core aggregation.

3. The method of claim 1, wherein the each one of the core aggregations is further associated with a minimum frequency requirement of an application.

4. The method of claim 1, wherein the each one of the core aggregations is further associated with the maximum size of an instruction set requirement of an application.

5. The method of claim 1, wherein the each one of the core aggregations is further associated with a different minimum frequency and a different maximum size of the instruction set.

6. The method of claim 1, wherein the thread is a latency-sensitive thread and the core aggregation has C-state disabled.

7. The method of claim 6, further comprising generating a report associated with execution of the thread.

8. An information handling system, comprising:
a basic input/output system configured to provide an interface for a core aggregation layout that identifies a grouping of a plurality of processor cores into core aggregations, wherein each of the core aggregations is associated with a maximum allowable C-state; and
a processor configured to:
monitor the information handling system during operation of an application to gather data associated with latency sensitivity of the application;
updating the core aggregation layout based on the data gathered during the operation of the application; and
pin a thread for execution to one of the processor cores based on the latency sensitivity of the application, the maximum allowable C-state, and on a maximum size of an instruction set of the application.

9. The information handling system of claim 8, wherein the processor is further configured to pin the thread based on a minimum frequency of the application.

10. The information handling system of claim 8, wherein the each one of the core aggregations is further associated with a minimum frequency.

11. The information handling system of claim 8, wherein the each one of the core aggregations is further associated with a different minimum frequency and a different maximum size of the instruction set.

12. A method comprising:
monitoring, by a processor, a workload during execution to collect data for determining a latency requirement of the workload;
training a machine learning model using the data during the execution of the workload to generate a core aggregation layout that includes one or more core aggregations, wherein each core aggregation includes one or more processor cores, and wherein each one of the core aggregations is associated with a maximum allowable C-state;
mapping each of the processor cores to one of the core aggregations;
routing a thread for execution to one of the processor cores based on a latency sensitivity of the thread and the maximum allowable C-state, wherein the routing the thread for the execution to the one of the core aggregations is further based on a maximum size of an instruction set; and
determining whether the workload is executing within the latency sensitivity of the thread and the maximum allowable C-state.

13. The method of claim 12, wherein the routing the thread for the execution to the one of the core aggregations is further based on a minimum frequency.

14. The method of claim 12, wherein the each one of the core aggregations is further associated with a minimum frequency of an application.

15. The method of claim 12, wherein the each one of the core aggregations is further associated with a different minimum frequency and a different maximum size of the instruction set.

16. The method of claim 12, wherein the thread is a latency-sensitive thread and the one processor core has C-state disabled.

17. The method of claim 12, further comprising reporting the mapping of the processor cores to the core aggregations to an operating system.

* * * * *